United States Patent
Cui

(10) Patent No.: US 10,133,115 B2
(45) Date of Patent: Nov. 20, 2018

(54) COLOR FILTER AND MANUFACTURING METHOD THEREOF, LIQUID CRYSTAL DISPLAY PANEL

(71) Applicant: Wuhan China Star Optoelectronics Technology Co., Ltd., Wuhan, Hubei (CN)

(72) Inventor: Hongqing Cui, Hubei (CN)

(73) Assignee: WUHAN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 101 days.

(21) Appl. No.: 14/785,997

(22) PCT Filed: May 25, 2015

(86) PCT No.: PCT/CN2015/079746
§ 371 (c)(1),
(2) Date: Dec. 31, 2015

(87) PCT Pub. No.: WO2016/176882
PCT Pub. Date: Nov. 10, 2016

(65) Prior Publication Data
US 2017/0146854 A1 May 25, 2017

(30) Foreign Application Priority Data
May 6, 2015 (CN) .......................... 2015 1 0227740

(51) Int. Cl.
*G02F 1/1335* (2006.01)
*G02F 1/1333* (2006.01)

(52) U.S. Cl.
CPC .. *G02F 1/133514* (2013.01); *G02F 1/133512* (2013.01); *G02F 1/133516* (2013.01);
(Continued)

(58) Field of Classification Search
CPC ......... G02F 1/133514; G02F 1/133512; G02F 1/133516; G02F 2001/133302; G02F 2001/133519
(Continued)

(56) References Cited

U.S. PATENT DOCUMENTS

2001/0026347 A1 10/2001 Sawasaki et al.
2005/0031973 A1* 2/2005 Kobayashi ............. B82Y 30/00
430/7
(Continued)

FOREIGN PATENT DOCUMENTS

CN 85106064 A 3/1987
CN 101158765 A 4/2008
(Continued)

OTHER PUBLICATIONS

Search Report and Written Opinion, dated Jan. 28, 2016, for International Application No. PCT/CN2015/079746.
(Continued)

*Primary Examiner* — Nathanael R Briggs
*Assistant Examiner* — William Peterson
(74) *Attorney, Agent, or Firm* — Kim Winston LLP

(57) ABSTRACT

A color filter and a manufacturing method thereof, as well as a liquid crystal display panel are disclosed. The color filter comprises a color resistance layer, a flat layer, and a first black matrix, wherein the flat layer is coated on the color resistance layer, and the first black matrix is arranged in the flat layer. According to the present disclosure, the critical angle of the color shift phenomenon of the color filter can be increased effectively, and thus the color shift phenomenon of the liquid crystal display panel under wide viewing angles can be alleviated.

12 Claims, 8 Drawing Sheets

(52) U.S. Cl.
 CPC ............ *G02F 2001/133302* (2013.01); *G02F 2001/133519* (2013.01)

(58) Field of Classification Search
 USPC ........................................................ 349/106
 See application file for complete search history.

(56) References Cited

U.S. PATENT DOCUMENTS

2009/0161047 A1    6/2009  Cho et al.
2010/0225858 A1*   9/2010  Dong ................ G02F 1/133512
                                                          349/106

FOREIGN PATENT DOCUMENTS

| CN | 101581852 A  | 11/2009 |
| CN | 101825802 A  | 9/2010  |
| CN | 202189163 U  | 4/2012  |
| CN | 102707357 A  | 10/2012 |
| CN | 103941462 A  | 7/2014  |
| JP | 2001201750 A | 7/2001  |

OTHER PUBLICATIONS

Office Action and Search Report, dated Apr. 27, 2017, for Chinese Patent Application No. 201510227740.3.
Office Action and Search Report, dated Jan. 29, 2018 for Chinese Patent Application No. 201510227740.3.

* cited by examiner

COLOR FILTER AND MANUFACTURING METHOD THEREOF, LIQUID CRYSTAL DISPLAY PANEL

CROSS REFERENCE TO RELATED APPLICATION

The present application claims benefit of Chinese patent application CN 201510227740.3, entitled "Color Filter and Manufacturing Method Thereof, Liquid Crystal Display Panel" and filed on May 6, 2015, the entirety of which is incorporated herein by reference.

FIELD OF THE INVENTION

The present disclosure relates to the technical field of liquid crystal display, and particularly to a color filter and a manufacturing method thereof, and a liquid crystal display panel.

BACKGROUND OF THE INVENTION

The liquid crystal display device has substituted traditional cathode-ray tube display device gradually and has been widely used in tablet television, personal computer, mobile display panel and other products by virtue of its advantages of low radiation, small volume, and low power consumption.

With the improvement of the resolution of the Liquid Crystal Display (LCD), the size of a single sub pixel is becoming increasingly small. As shown in FIG. 1, when the light emitted by the backlight source enters into a sub pixel B with a relatively large inclining angle, the light would pass through the sub pixel B in the active area, and at the same time, part of the light would incorrectly enter into a color resistance layer of a sub pixel A that is adjacent to the sub pixel B after passing through the liquid crystal molecule layer. Under such circumstances, the colors displayed in the LCD would mix with one another. Consequently, under wide viewing angles, the colors presented by the LCD would have a serious deviation. That is, there would be the color shift problem in the LCD under wide viewing angles.

In the prior art, the color shift problem of the LCD under wide viewing angles is generally reduced through increasing a width of a black matrix thereof in order to guarantee that other optical properties of the display panel are not changed. In this case, however, the aperture ratio and the penetration of the display panel would be reduced inevitably.

SUMMARY OF THE INVENTION

The present disclosure aims to solve the technical problem of color shift of the liquid crystal display panel in the prior art under wide viewing angles. In order to solve the aforesaid technical problem, one embodiment of the present disclosure first provides a color filter, comprising a color resistance layer, a flat layer, and a first black matrix, wherein said flat layer is coated on said color resistance layer, and said first black matrix is arranged in said flat layer.

According to one embodiment of the present disclosure, said first black matrix is formed on said color resistance layer through printing or photolithography.

According to one embodiment of the present disclosure, said first black matrix is formed through carbonizing said flat layer at a position corresponding to a data line.

According to one embodiment of the present disclosure, said color filter further comprises a second black matrix, which is formed on a glass substrate, and said color resistance layer is coated on said second black matrix and the glass substrate.

According to one embodiment of the present disclosure, said color filter further comprises a common electrode layer, which is formed on said flat layer.

The present disclosure further provides a liquid crystal display panel, which comprises the color filter as mentioned in any one of the above claims.

The present disclosure further provides a method for manufacturing a color filter, and the method comprises the following steps:

forming a color resistance layer, and then forming a first black matrix on said color resistance layer; and forming a flat layer on said first black matrix and said color resistance layer.

The present disclosure further provides a method for manufacturing a color filter, and the method comprises the following steps:

forming a color resistance layer, and then forming a flat layer on said color resistance layer; and carbonizing said flat layer at a position corresponding to a data line so as to form a first black matrix in said flat layer.

According to one embodiment of the present disclosure, said flat layer is carbonized by laser irradiation at said position.

According to one embodiment of the present disclosure, the method further comprises a step of forming a second black matrix on a glass substrate before said color resistance layer is formed.

According to the present disclosure, the critical angle of the color shift phenomenon of the color filter can be improved effectively, and thus the color shift phenomenon of the liquid crystal display panel under wide viewing angles can be alleviated. Meanwhile, according to the present disclosure, the thickness of each layer of the color filter and the width of the black matrix do not need to be changed, and thus other optical properties of the liquid crystal display panel would not be changed. Moreover, since the width of the black matrix is not increased, the aperture ratio and the penetration of the liquid crystal display panel would not be reduced.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments or the prior art are introduced briefly below to illustrate the technical solutions of the embodiments of the present disclosure or the prior art more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Many specific details are illustrated hereinafter for providing a thorough understanding of the embodiments of the present disclosure. However, it is obvious for those skilled in the art that, the present disclosure can be implemented in other methods in addition to the details or specifics described herein.

Figure 1:
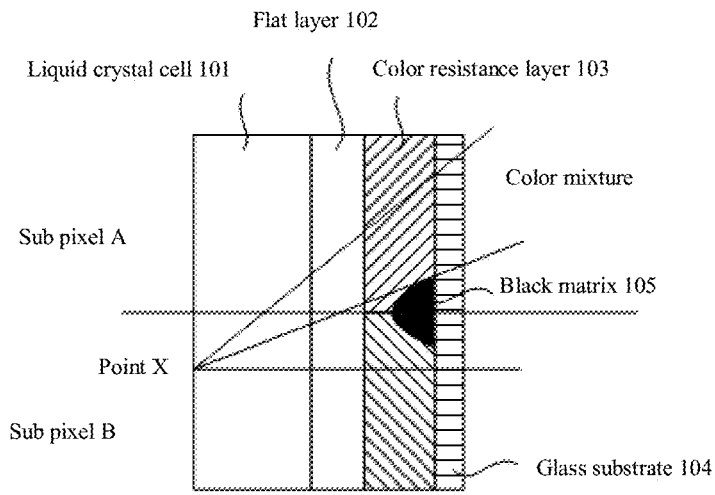
FIG. 1 schematically shows a critical angle at which a color mixture would occur to the inclining incident light at point X of a sub pixel B of a liquid crystal display panel in the prior art.

FIG. 1 schematically shows a structure of two adjacent sub pixels of a liquid crystal display panel in the prior art. The liquid crystal display panel comprises a liquid crystal cell 101, a flat layer 102, a color resistance layer 103, a glass substrate 104, and a black matrix 105 that is formed on the glass substrate 104. The sub pixel A and the sub pixel B are two adjacent sub pixels. The color resistance layer 103 which covers the sub pixel A has a red color, while the color resistance layer 103 which covers the sub pixel B has a green color. The glass substrate 104, the color resistance layer 103, the black matrix 105, and the flat layer 102 jointly constitute a color filter of the liquid crystal display panel.

In a Thin Film Transistor (TFT) LCD, an active layer amorphous silicon (a-Si) in the a-Si TFT is a light sensitive material. A channel is arranged at a top of TFT in a bottom-gate element. Therefore, during the using of TFT-LCD, the ambient light would irradiate the a-Si material of the channel directly, and thus the performance of TFT would be adversely affected. The channel can be shaded by the black matrix, so that the ambient light can be prevented from irradiating the a-Si material of the channel directly.

In addition, a gap between two adjacent sub pixels is an area with no power applied, and the contrast of an image displayed therein would be reduced seriously if light leakage occurs. The light leakage phenomenon can be alleviated by the black matrix that is arranged between the two adjacent sub pixels.

With respect to a point X of the sub pixel B, a critical angle $\theta_x$ at which the light $$\tan\theta_x = \frac{p_x}{T_{PR} + T_{OC} + d - T_{BM}}$$

that enters from the point X can exactly pass over the black matrix 105 and enter into the sub pixel A can be calculated according to the following formula (1):

$$\tan\theta_x = \frac{p_x}{T_{PR} + T_{OC} + d - T_{BM}}$$

wherein $p_x$ represents a distance between the point X and the boundary of the sub pixel A, $T_{PR}$ represents a thickness of the color resistance layer, $T_{OC}$ represents a thickness of the flat layer, d represents a thickness of the liquid crystal cell, and $T_{BM}$ represents a thickness of the black matrix.

In order to avoid the color mixture phenomenon, the critical angle $\theta_x$ should be selected as large as possible. Therefore, it is very important to control the thicknesses of the layers of the color filter. In general, in order to obtain a relatively large critical angle $\theta_x$, the thickness $T_{BM}$ of the black matrix should be selected as large as possible, and at the same time, the thicknesses of the color resistance layer, the flat layer, and the liquid crystal cell should be selected as small as possible. However, the optical properties of the display panel would be changed if the thicknesses of the layers of the color filter are changed.

Figure 2:
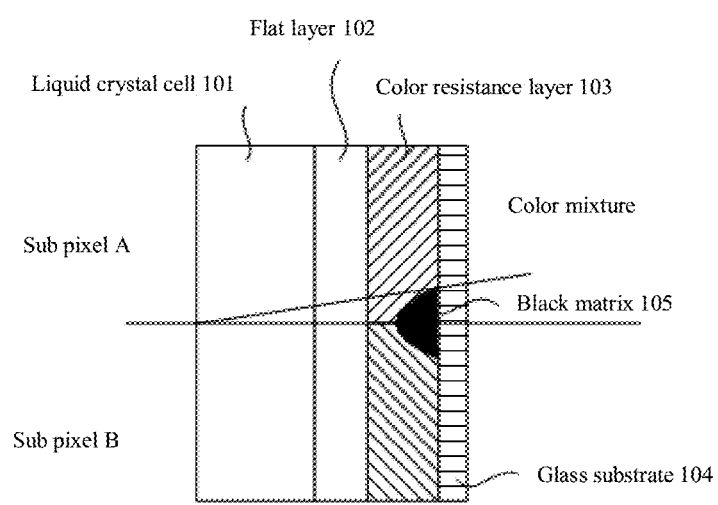
FIG. 2 schematically shows a critical angle at which the color mixture would occur to the inclining incident light at an intersection point of two adjacent sub pixels of a liquid crystal display panel in the prior art.

As shown in FIG. 2, with respect to the light that enters from an intersection point of two adjacent sub pixels, the critical angle $\theta_0$ at which the color mixture phenomenon would occur can be calculated according to the following formula (2):

$$\tan\theta_0 = \frac{L_{BM}}{2(T_{PR} + T_{OC} + d)}$$

wherein $L_{BM}$ represents a width of the black matrix.

In order to reduce the color shift phenomenon of the LCD under wide viewing angles and keep other optical properties of the liquid crystal display panel unchanged at the same time, the width of the black matrix is increased in the prior art. In this case, however, the aperture ratio and the penetration of the display panel would be reduced inevitably.

In order to eliminate the aforesaid defect of the color filter in the prior art, the present disclosure provides a new color filter and a liquid crystal display panel comprising the color filter. According to the present disclosure, the color filter comprises a color resistance layer, a flat layer, and a first black matrix, wherein the flat layer is coated on the color resistance layer, and the first black matrix is not formed on the glass substrate as the color filter in the prior art, but arranged in the flat layer instead. In this case, the relative height of the black matrix can be improved under the condition that the thickness of the black matrix is not changed, so that the light leakage of the inclining incident light can be reduced and the color shift phenomenon of the LCD under wide viewing angles can be alleviated.

The principles, structures, and advantages of the color filter according to the present disclosure will be further illustrated hereinafter with reference to different embodiments.

Embodiment 1

Figure 3:
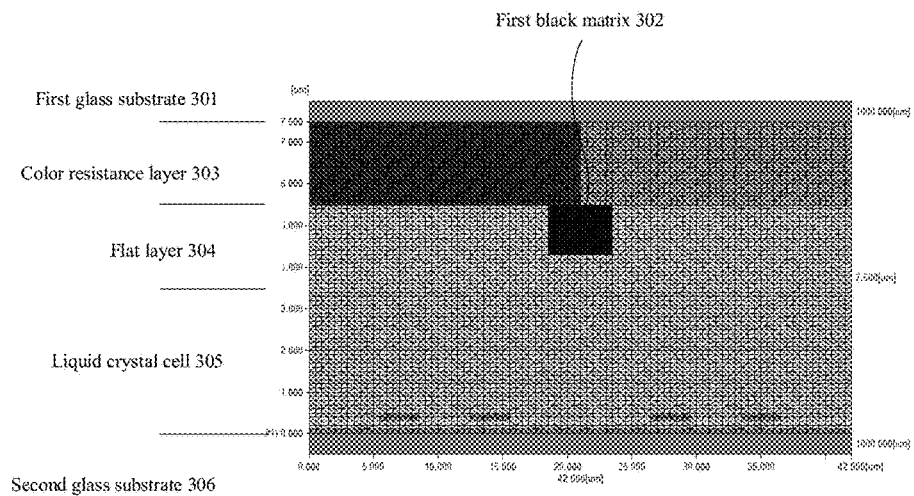
FIG. 3 schematically shows a structure of a liquid crystal display panel according to one embodiment of the present disclosure.

FIG. 3 schematically shows a structure of a liquid crystal display panel according to the present embodiment.

As shown in FIG. 3, the liquid crystal display panel according to the present embodiment comprises a first glass substrate 301, a first black matrix 302, a color resistance layer 303, a flat layer 304, a liquid crystal cell 305, and a second glass substrate 306, wherein the first glass substrate 301, the first black matrix 302, the color resistance layer 303, and the flat layer 304 jointly constitute a color filter.

According to the present embodiment, during the manufacturing of the color filter, the color resistance layer 303 is formed on the first glass substrate 301 first, the first black matrix 302 is formed on the color resistance layer 303 then, and the flat layer 304 is formed on the color resistance layer 303 and the first black matrix 302 at last. According to the present embodiment, the first black matrix 302 is formed on the color resistance layer 303 through printing. It should be noted that, according to other embodiments of the present disclosure, the first black matrix 302 can be formed on the color resistance layer 303 through other reasonable methods, such as photolithography. The present disclosure is not limited by this.

Since the flat layer 304 is coated after the first black matrix 302 is formed, the first black matrix 302 would not affect the tape angle between the two adjacent sub pixels, and the gap between the two adjacent sub pixels would not be increased. It can be seen that, the fact that the first black matrix 302 is formed on the color resistance layer 303 would not affect the planar arrangement of the liquid crystal molecules.

Figure 4:
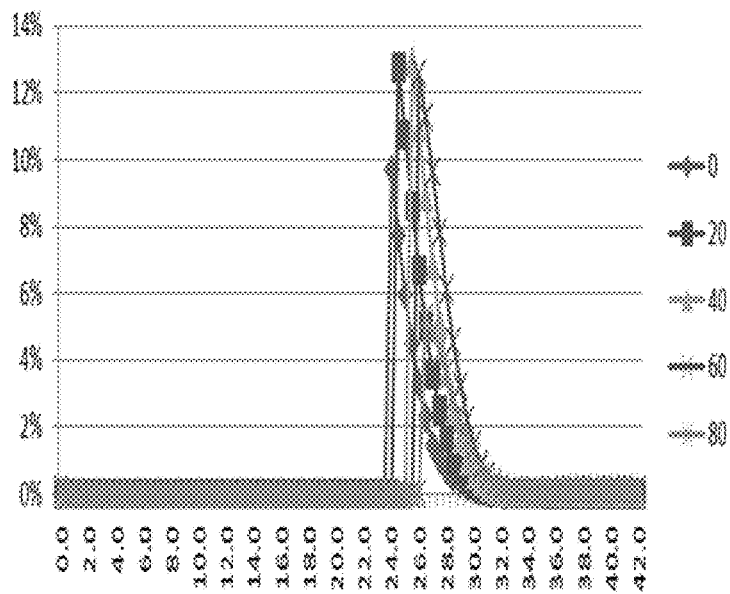
FIG. 4 is a color mixture diagram and a light leakage diagram of sub pixels in a dark state under different inclining angles of a liquid crystal display panel according to one embodiment of the present disclosure.

In the liquid crystal display panel according to the present embodiment, the thickness of the color resistance layer 303 is 2 μm, the thickness of the first black matrix is 1.2 μm, the thickness of the flat layer is 2 μm, the thickness of the liquid crystal cell is 3.2 μm, and the width of the sub pixel is 21 μm. A color mixture diagram and a light leakage diagram of sub pixels in a dark state under different inclining angles of the liquid crystal display panel as shown in FIG. 4 can be obtained through simulation.

Figure 5:
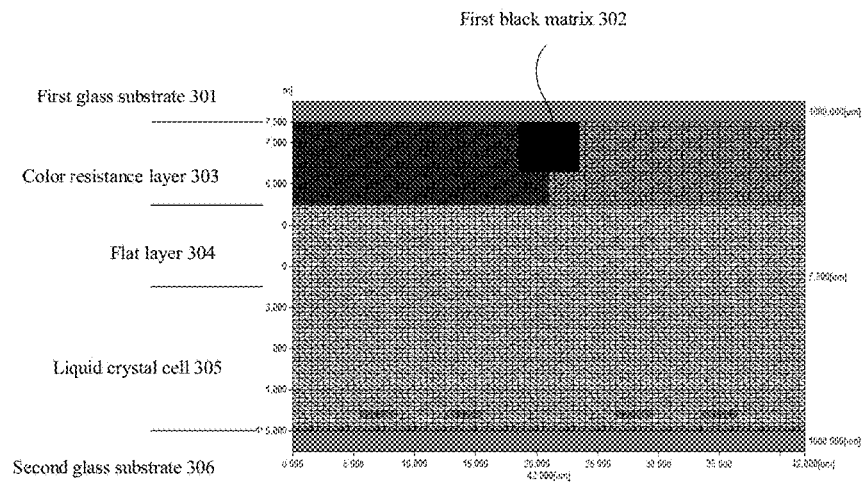
FIG. 5 schematically shows a structure of a liquid crystal display panel in the prior art.

FIG. 5 schematically shows a structure of a liquid crystal display panel in the prior art. It can be seen through comparing FIG. 3 with FIG. 5 that, in the display panel in the prior art, the first black matrix 302 is formed on the first glass substrate 301. During the manufacturing of the liquid crystal display panel in the prior art, the first black matrix 302 is formed on the first glass substrate 301 first, the color resistance layer 303 is formed on the first glass substrate 301 and the first black matrix 302 then, and the flat layer 304 is formed on the color resistance layer 303 at last.

In order to illustrate the advantages of the color filter and the liquid crystal display panel provided by the present embodiment more clearly, the thickness of each layer of the liquid crystal display panel as shown in FIG. 5 is equal to that of a corresponding layer of the liquid crystal display panel as shown in FIG. 3. During the analysis, in the two sub pixels as shown in FIG. 3 as well as those as shown in FIG. 5, the left sub pixel is activated, while the right sub pixel is in the dark state.

Figure 6:
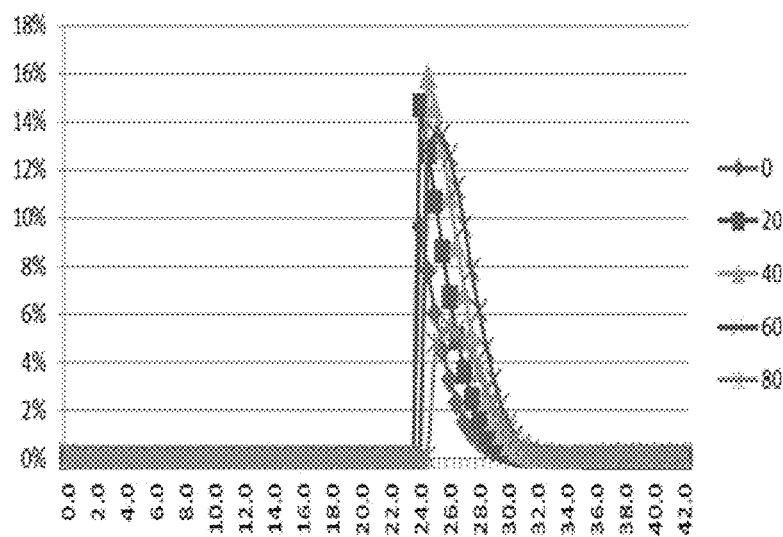
FIG. 6 is a color mixture diagram and a light leakage diagram of sub pixels in a dark state under different inclining angles of a liquid crystal display panel in the prior art.
Figure 7:
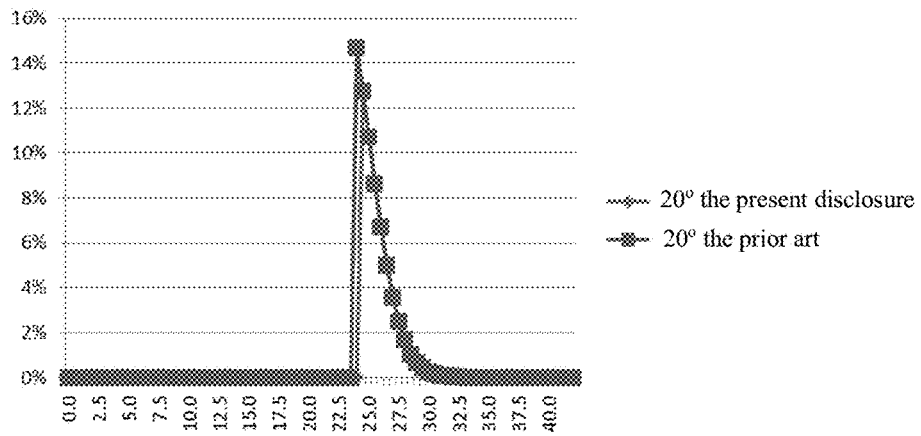
FIG. 7 to FIG. 10 are light leakage diagrams at each position of the sub pixels in a dark state of a color filter in the prior art and a color filter according to one embodiment of the present disclosure under an inclining angle of 20°, an inclining angle of 40°, an inclining angle of 60°, and an inclining angle of 80° respectively.
Figure 8:
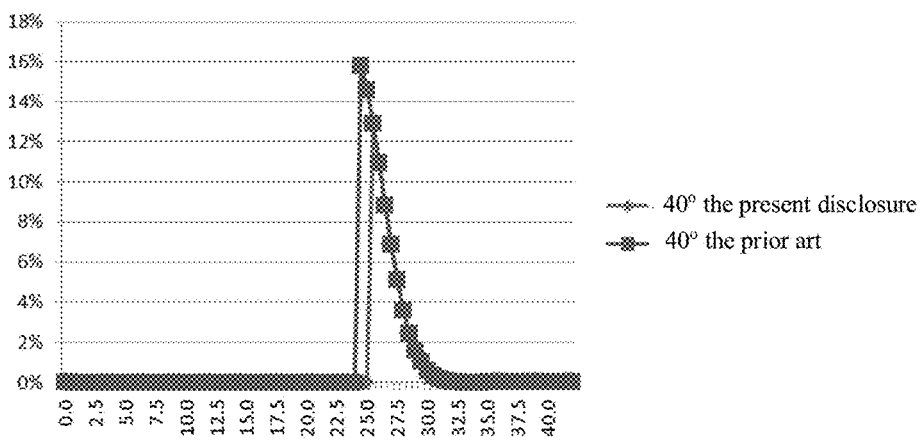
Figure 9:
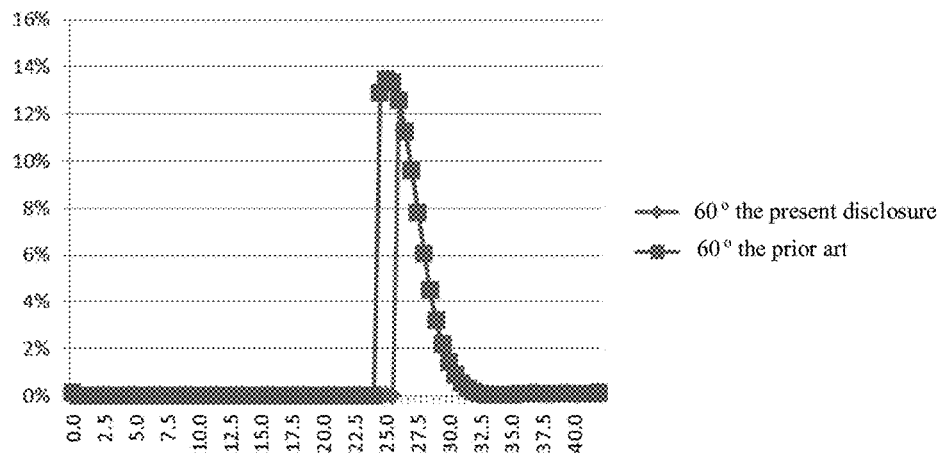
Figure 10:
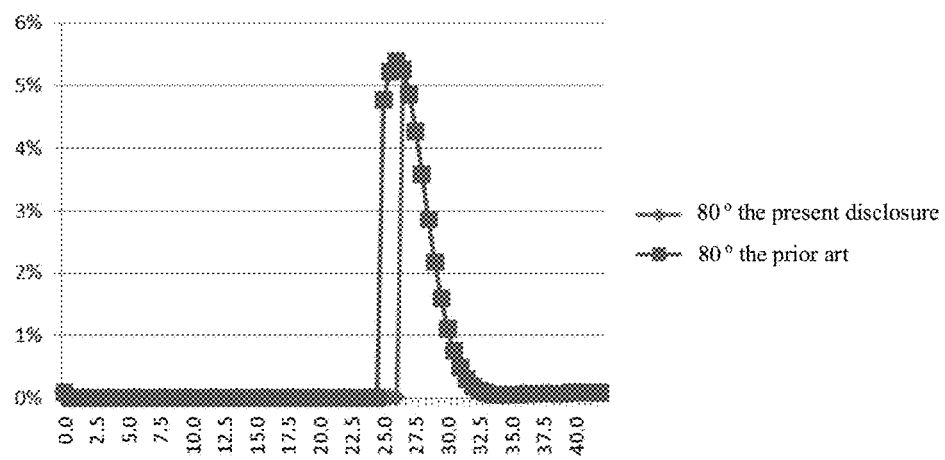

FIG. 6 is a color mixture diagram and a light leakage diagram of sub pixels in a dark state under different inclining angles of a liquid crystal display panel in the prior art. It can be seen from FIG. 4 and FIG. 6 that, according to the present embodiment, the light leakage of the sub pixels in the dark state would occur at the horizontal ordinate of [24 μm, 30 μm], and the light leakage of the sub pixels in the dark state is the most serious at the inclining angle of 40°. However, compared with the liquid crystal display panel in the prior art, the light leakage of the sub pixels in the dark state under different inclining angles in the liquid crystal display panel according to the present embodiment is less serious.

In order to illustrate the advantages of the color filter and the liquid crystal display panel provided by the present embodiment more clearly, the present embodiment will be further explained below taking the light leakage diagrams at each position of the sub pixels in the dark state of the two kinds of color filters under the same inclining angle as examples.

FIG. 7 to FIG. 10 are light leakage diagrams at each position of the sub pixels in a dark state of a color filter in the prior art and a color filter according to the present embodiment under an inclining angle of 20°, an inclining angle of 40°, an inclining angle of 60°, and an inclining angle of 80° respectively. It can be seen obviously from FIG. 7 to FIG. 10 that, under different inclining angles, the extents of light leakage of the sub pixels in the dark state of the color filter according to the present embodiment are all lower than those of the color filter in the prior art.

Figure 11:
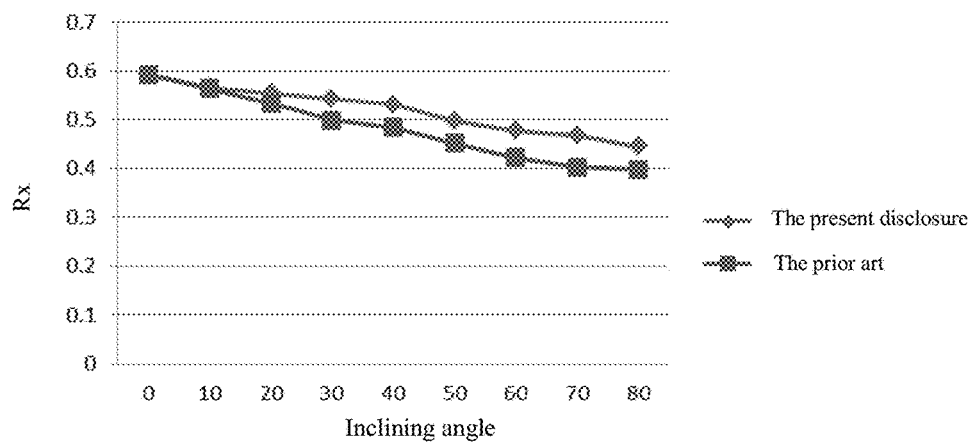
FIG. 11 and FIG. 12 are change trend diagrams of chromaticity coordinates Rx and Ry of a color filter according to one embodiment of the present disclosure and a color filter in the prior art under different inclining angles respectively.
Figure 12:
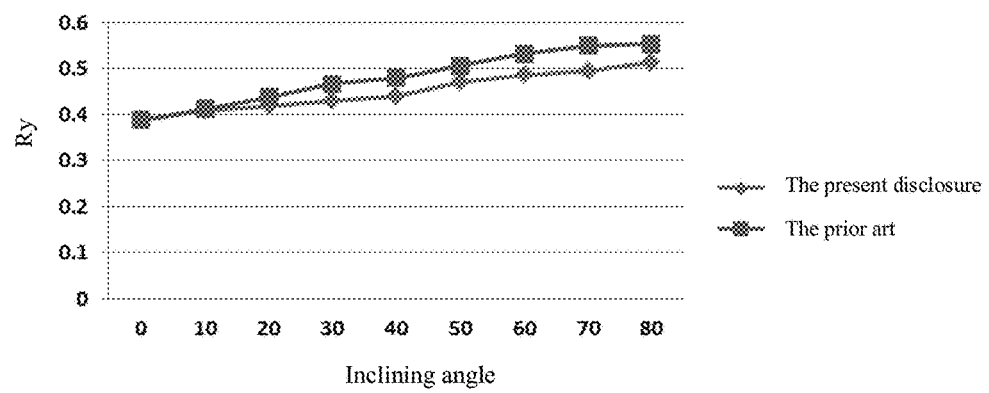

FIG. 11 and FIG. 12 are change trend diagrams of chromaticity coordinates Rx and Ry of a color filter in the prior art and a color filter according to the present embodiment under different inclining angles respectively. It can be seen from FIG. 11 and FIG. 12 that, compared with the color filter in the prior art, the chromaticity coordinates Rx and Ry of the color filter provided by the present embodiment both change more slowly, which shows that the color shift generated by the color filter according to the present embodiment is relatively low.

Embodiment 2

Figure 13:
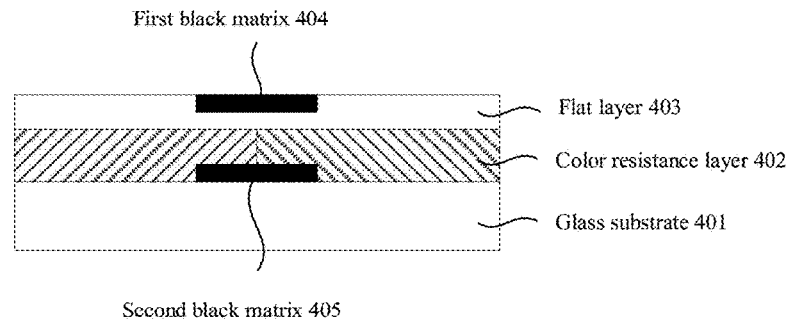
FIG. 13 schematically shows a structure of a color filter according to one embodiment of the present disclosure.

FIG. 13 schematically shows a structure of a color filter according to the present embodiment.

As shown in FIG. 13, the color filter according to the present embodiment comprises a glass substrate 401, a color resistance layer 402, a flat layer 403, and a first black matrix 404. During the manufacturing of the color filter, the color resistance layer 402 is formed on the glass substrate 401 first, the flat layer 403 is formed on the color resistance layer 402 then, and the first black matrix 404 is formed in the flat layer 403 at last.

According to the present embodiment, the first black matrix 404 is formed in the flat layer 403 through carbonizing the flat layer 403 at a position corresponding to a data line. Specifically, according to the present embodiment, the first black matrix 404 is formed through irradiating the position corresponding to the data line of the flat layer 403 by laser. H element and O element of the flat layer 403 can be removed by the laser irradiation, while C element is reserved. In this manner, the irradiation position is changed into black color and thus the first black matrix 404 can be formed.

It should be noted that, according to other embodiments of the present disclosure, the color filter can be manufactured in a method similar to the color filter in the prior art. That is, a second black matrix 405 is formed on the glass substrate 401 first, the color resistance layer 402 is formed on the glass substrate 401 and the second black matrix 405 then, the flat layer 403 is formed on the color resistance layer 402 next, and the first black matrix 404 is formed in the flat layer 403 at last. The present disclosure is not limited by this. In this case, the manufacturing procedures of the color filter according to the present embodiment are the same as those of the color filter in the prior art before the first black matrix 404 is formed, and thus the climbing of the manufacturing cost resulted from manufacturing procedure changing can be reduced.

Figure 14:
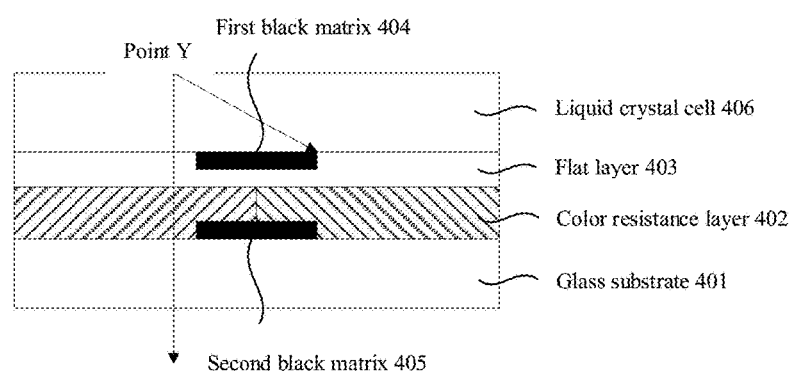
FIG. 14 schematically shows a structure of a liquid crystal display panel according to one embodiment of the present disclosure.
Figure 15:
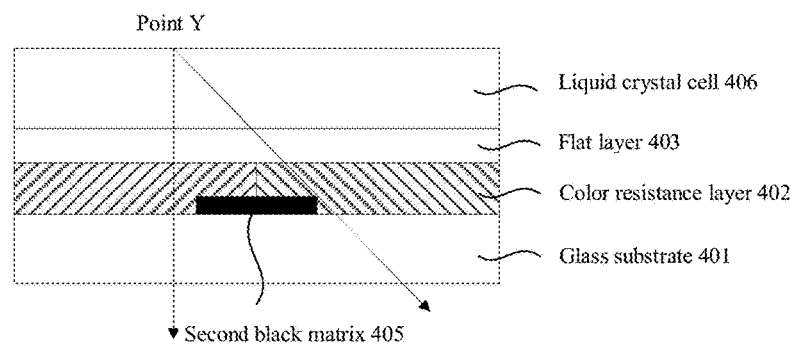
FIG. 15 schematically shows a structure of a liquid crystal display panel in the prior art.

The present embodiment further provides a new liquid crystal display panel, as shown in FIG. 14. The liquid crystal display panel comprises the color filter provided by the present embodiment and a liquid crystal cell 406. FIG. 15 schematically shows a structure of a liquid crystal display panel in the prior art.

It can be seen from FIG. 14 and FIG. 15 that, when the thickness of each layer of the liquid crystal display panel as shown in FIG. 14 is equal to that of a corresponding layer of the liquid crystal display panel as shown in FIG. 15, with respect to a point Y of the left sub pixel, the critical angle at which the light that enters from the point Y can exactly pass over the black matrix and enter into the right sub pixel of the liquid crystal display panel according to the present disclosure is larger than the critical angle of the liquid crystal display panel in the prior art. Similarly, with respect to the light that enters from an intersection point of two adjacent sub pixels, the critical angle at which the color mixture phenomenon would occur in the liquid crystal display panel according to the present disclosure is also larger than the critical angle of the liquid crystal display panel in the prior art. Therefore, the color shift phenomenon under wide viewing angles can be alleviated by the color filter and the liquid crystal display panel provided by the present embodiment.

Figure 16:
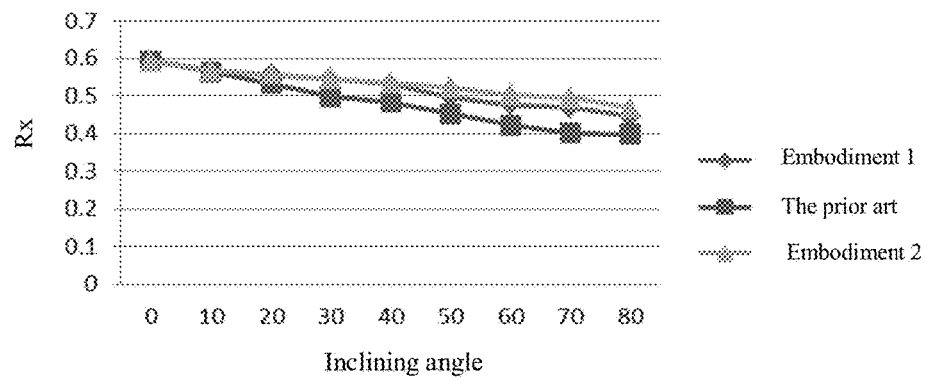
FIG. 16 and FIG. 17 are change trend diagrams of chromaticity coordinates Rx and Ry of different color filters under different inclining angles respectively.
Figure 17:
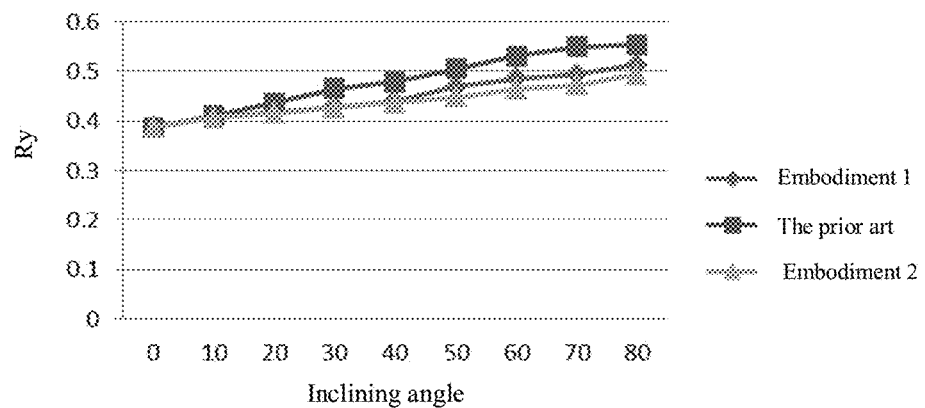

FIG. 16 and FIG. 17 are change trend diagrams of chromaticity coordinates Rx and Ry of the color filter in the prior art, the color filter provided by embodiment 1, and the color filter provided by the present embodiment under different inclining angles respectively. It can be seen from FIG. 16 and FIG. 17 that, compared with the color filter in the prior art and the color filter provided by embodiment 1, the chromaticity coordinates Rx and Ry of the color filter provided by the present embodiment both change more slowly, which shows that the color shift generated by the color filter according to the present embodiment is relatively low. Therefore, the color shift phenomenon under wide viewing angles of the liquid crystal display panel can be alleviated.

It should be noted that, the color filter and the liquid crystal display panel as mentioned above are mainly used in In-Plane Switching (IPS) panel, which does not comprise a corresponding Indium Tin Oxide (ITO) layer (such as a common electrode layer) on the above side of the liquid crystal layer (i.e., in the color filter). However, it does not mean that the technical solution provided by the present disclosure is only applicable for the IPS liquid crystal display panel. The technical solution provided by the present disclosure can also be used in other types of display panels according to actual needs, and the present disclosure is not limited by this. For example, according to one embodiment of the present disclosure, the liquid crystal display panel can also be a Twisted Nematic (TN) panel. In the TN panel, the color filter further comprises a common electrode layer, which is formed on the flat layer.

It can be seen from the above description that, in the color filter according to the present disclosure, the critical angle of the color shift phenomenon can be improved effectively, and at the same time, the thickness of each layer of the color filter and the width of the black matrix do not need to be changed. Therefore, other optical properties of the liquid crystal display panel would not be changed. Since the width of the black matrix is not increased, the aperture ratio and the penetration of the liquid crystal display panel would not be reduced.

It could be understood that, the embodiments disclosed herein are not limited by the specific structures, treatment steps or materials disclosed herein, but incorporate the equivalent substitutes of these features which are comprehensible to those skilled in the art. It could be also understood that, the terms used herein are used for describing the specific embodiments, not for limiting them.

The phrases "one embodiment" or "embodiments" referred to herein mean that the descriptions of specific features, structures and characteristics in combination with the embodiments are included in at least one embodiment of the present disclosure. Therefore, the phrases "one embodiment" or "embodiments" appeared in different parts of the whole description do not necessarily refer to the same embodiment.

For the purpose of convenience, a plurality of items, structural units, component units and/or materials used herein can be listed in a common list. However, the list shall be understood in a way that each element thereof represents an only and unique member. Therefore, when there is no other explanation, none of members of the list can be understood as an actual equivalent of other members in the same list only based on the fact that they appear in the same list. In addition, the embodiments and examples of the present disclosure can be explained with reference to the substitutes of each of the components. It could be understood that, the embodiments, examples and substitutes herein shall not be interpreted as the equivalents of one another, but shall be considered as separate and independent representatives of the present disclosure.

In addition, the features, structures and characteristics described herein can be combined with one another in any other suitable way in one embodiment or a plurality of embodiments. The specific details, such as lengths, widths and shapes, described herein are used for providing a comprehensive understanding of the embodiments of the present disclosure. However, it is understandable for those skilled in the art that, the present disclosure may be implemented in other ways different from the specific details specified herein, or may be implemented in other methods, components and materials. The structures, materials and operations known to all are not shown or described in the examples to avoid blurring various aspects of the present disclosure.

The embodiments are described hereinabove to interpret the principles of the present disclosure in one application or a plurality of applications. However, a person skilled in the art, without departing from the principles and thoughts of the present disclosure, can make various modifications to the forms, usages and details of the embodiments of the present disclosure without any creative work. Therefore, the protection scope of the present disclosure shall be determined by the claims.

The invention claimed is:

1. A color filter, comprising a color resistance layer, a flat layer, and a first black matrix, wherein said flat layer is coated on said color resistance layer, and said first black matrix is arranged in said flat layer, and wherein said first black matrix is formed through carbonizing said flat layer at a position corresponding to a data line, wherein carbonization for the flat layer removes H element and O element of the flat layer, while C element is reserved.

2. The color filter according to claim 1, wherein said first black matrix is formed on said color resistance layer through printing or photolithography.

3. The color filter according to claim 1, wherein said color filter further comprises a second black matrix, which is formed on a glass substrate, and said color resistance layer is coated on said second black matrix and the glass substrate.

4. The color filter according to claim 1, wherein said color filter further comprises a common electrode layer, which is formed on said flat layer.

5. A liquid crystal display panel, comprising a color filter, which comprises a color resistance layer, a flat layer, and a first black matrix, wherein said flat layer is coated on said color resistance layer, and said first black matrix is arranged in said flat layer, and wherein said first black matrix is formed through carbonizing said flat layer at a position corresponding to a data line, wherein carbonization for the flat layer removes H element and O element of the flat layer, while C element is reserved.

6. The liquid crystal display panel according to claim 5, wherein said first black matrix is formed on said color resistance layer through printing or photolithography.

7. The liquid crystal display panel according to claim 5, wherein said color filter further comprises a second black matrix, which is formed on a glass substrate, and said color resistance layer is coated on said second black matrix and the glass substrate.

8. The liquid crystal display panel according to claim 5, wherein said color filter further comprises a common electrode layer, which is formed on said flat layer.

9. A method for manufacturing a color filter, comprising the following steps:
   forming a color resistance layer, and then forming a flat layer on said color resistance layer; and
   carbonizing said flat layer at a position corresponding to a data line so as to form a first black matrix in said flat layer, wherein carbonization for the flat layer removes H element and O element of the flat layer, while C element is reserved.

10. The method according to claim 9, wherein said flat layer is carbonized by laser irradiation at said position.

11. The method according to claim 9, further comprising a step of forming a second black matrix on a glass substrate before said color resistance layer is formed.

12. The method according to claim 10, further comprising a step of forming a second black matrix on a glass substrate before said color resistance layer is formed.

* * * * *